(No Model.)
L. H. WHITNEY.
CLOTHES BEATER.
No. 266,938. Patented Oct. 31, 1882.
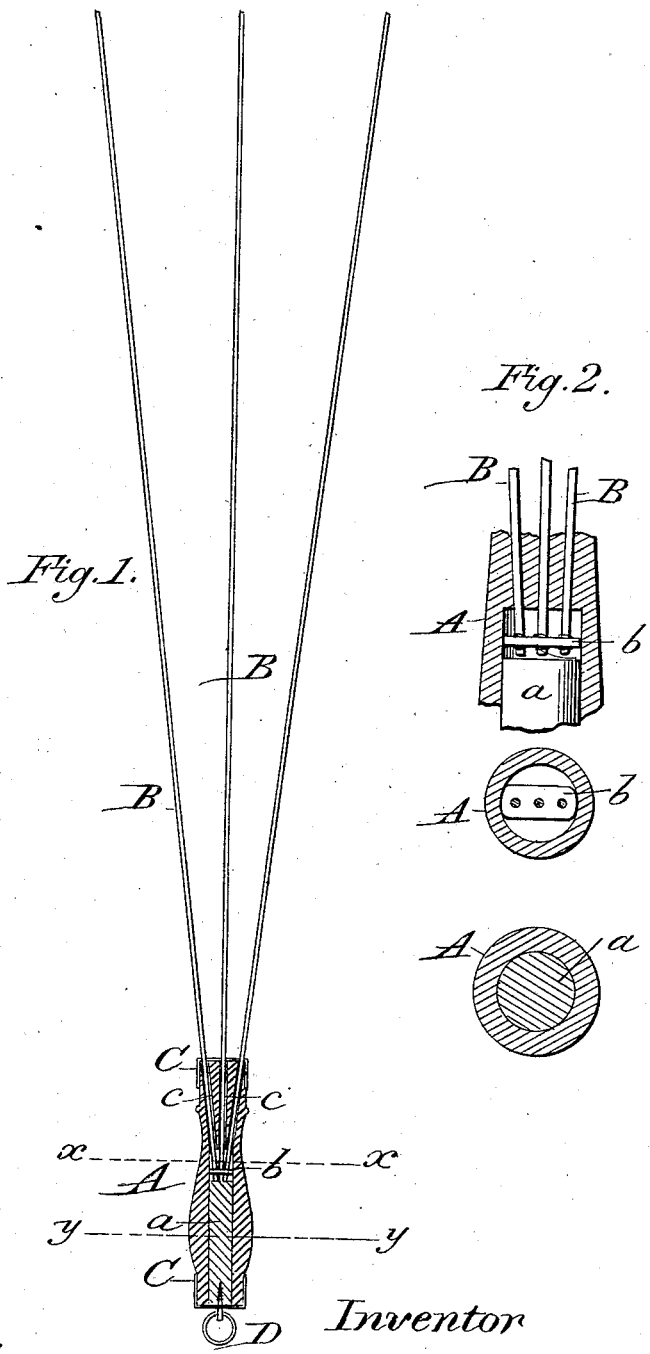
Witnesses
Geo. W. Raynes
John J. Gorman.
Inventor
Levi H. Whitney

UNITED STATES PATENT OFFICE.

LEVI H. WHITNEY, OF LOWELL, MASSACHUSETTS.

CLOTHES-BEATER.

SPECIFICATION forming part of Letters Patent No. 266,938, dated October 31, 1882.

Application filed February 21, 1882. (No model.)

*To all whom it may concern:*

Be it known that I, LEVI H. WHITNEY, a citizen of the United States, residing at Lowell, in the county of Middlesex and State of Massachusetts, have invented certain new and useful Improvements in Clothes-Beaters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of beaters, whisks, or switches that are used for beating dust from clothing, carpets, and other fabrics of various kinds; and my improvement therein consists in the construction and arrangement of parts, as hereinafter more fully described and claimed.

The invention is illustrated in the annexed drawings, in which Figure 1 represents a side view of the implement, showing a longitudinal section through the handle; and Fig. 2 represents an enlarged longitudinal section, and also cross-sectional details on the lines $x$ $x$ and $y$ $y$, illustrating the construction of the handle and the manner of securing the beaters therein.

Like letters indicate like parts.

A represents the handle, which is hollow at one end, its opposite end being perforated, as shown at $c$ $c$, Fig. 1, for the reception of the ends of the rods, wires, or reeds B that form the beaters. These beaters, which may be of any suitable number, are preferably composed of spring-steel, and may be of any length or thickness desired, according to the size of the implement required.

In constructing the beating implement the rods or wires B are preferably connected at one end by a bridge-piece, $b$, to which they may be soldered or otherwise secured in any suitable manner. The free ends of the wires are then passed into the hollow end of the handle and through the perforations $c$ $c$ until the bridge $b$, which fits said hollow portion, is brought nearly or quite to its lower end. The hollow portion of the handle is then plugged or filled by means of a core, $a$, the end of which rests against the bridge-piece, or against the ends of the wires projecting through the same. The handle is strengthened at each end and prevented from splitting by means of the caps or ferrules C C, and a loop or ring, D, is provided for the purpose of suspending the implement when not in use.

This method of attaching the wires, reeds, or switches B to the handle A furnishes a firm connection of the parts, and one that is readily applied. It will also be observed that the rods or wires are attached in such a manner that they may be readily disconnected and replaced when desired.

The implement will be found useful in cleaning garments, carpets, and all woolen and similar fabrics which require beating in order to remove accumulated dust and dirt. The elasticity of the wires enables the implement to be used without liability of injury to the most delicate fabrics, and will produce the desirable effect of restoring the original nap to the goods under treatment.

What I claim as my invention is—

In a beater for removing dust from clothing, carpets, and similar fabrics, the combination of the handle A, hollow at one end, elastic rods or wires B, connected within the handle by means of a bridge-piece, $b$, the core or plug $a$, inserted in one end of the handle, and the caps or ferrules C C, attached at each end, all substantially as and for the purpose described.

In testimony whereof I affix my signature in presence of two witnesses.

LEVI H. WHITNEY.

Witnesses:
HARRY F. CADY,
CHAS. H. CONANT.